United States Patent [19]

Stuart

[11] Patent Number: 4,561,511

[45] Date of Patent: Dec. 31, 1985

[54] TORSION LOAD CELL

[75] Inventor: James M. Stuart, Malvern, Pa.

[73] Assignee: Malvern Scale Company, Malvern, Pa.

[21] Appl. No.: 670,659

[22] Filed: Nov. 9, 1984

Related U.S. Application Data

[63] Continuation of Ser. No. 510,692, Jul. 5, 1983, abandoned.

[51] Int. Cl.⁴ .......................... G01G 3/00; G01G 1/24; G01G 3/14
[52] U.S. Cl. ................................ 177/225; 177/210 C; 177/210 R; 177/196; 177/DIG. 9
[58] Field of Search ..... 177/210 C, 210 FP, 210 EM, 177/210 R, 211, 225, 196

[56] References Cited

U.S. PATENT DOCUMENTS

| | | | |
|---|---|---|---|
| 2,641,460 | 6/1953 | Larson | 177/225 X |
| 3,249,164 | 5/1966 | Seed | 177/225 |
| 3,773,124 | 11/1973 | Bullivant | 177/211 X |
| 4,158,395 | 8/1977 | Brown | 177/210 |
| 4,273,204 | 5/1978 | Gillen | 177/210 |
| 4,308,929 | 3/1980 | Estavoyer | 177/210 |
| 4,381,040 | 4/1983 | Brouwer | 177/210 C |
| 4,463,604 | 8/1984 | Kitagawa et al. | 177/211 X |

Primary Examiner—E. A. Goldberg
Assistant Examiner—Patrick W. Foster
Attorney, Agent, or Firm—Caesar, Rivise, Bernstein & Cohen

[57] ABSTRACT

An electronic scale used for weighing an object or material. The scale includes a platform arranged to move upon receipt of a material thereon. The device further includes frame means, a variable capacitor having a first and a second plate, torsional spring means which is coupled both to the frame means and to the platform means such that movement of the platform means upon receipt of the material thereon causes the torsional means to twist about an axis without incurring non-torsional deformation. This results in one of the plates being displaced relative to the other of the plates to produce an electrical signal indicative of the weight of the material.

5 Claims, 5 Drawing Figures

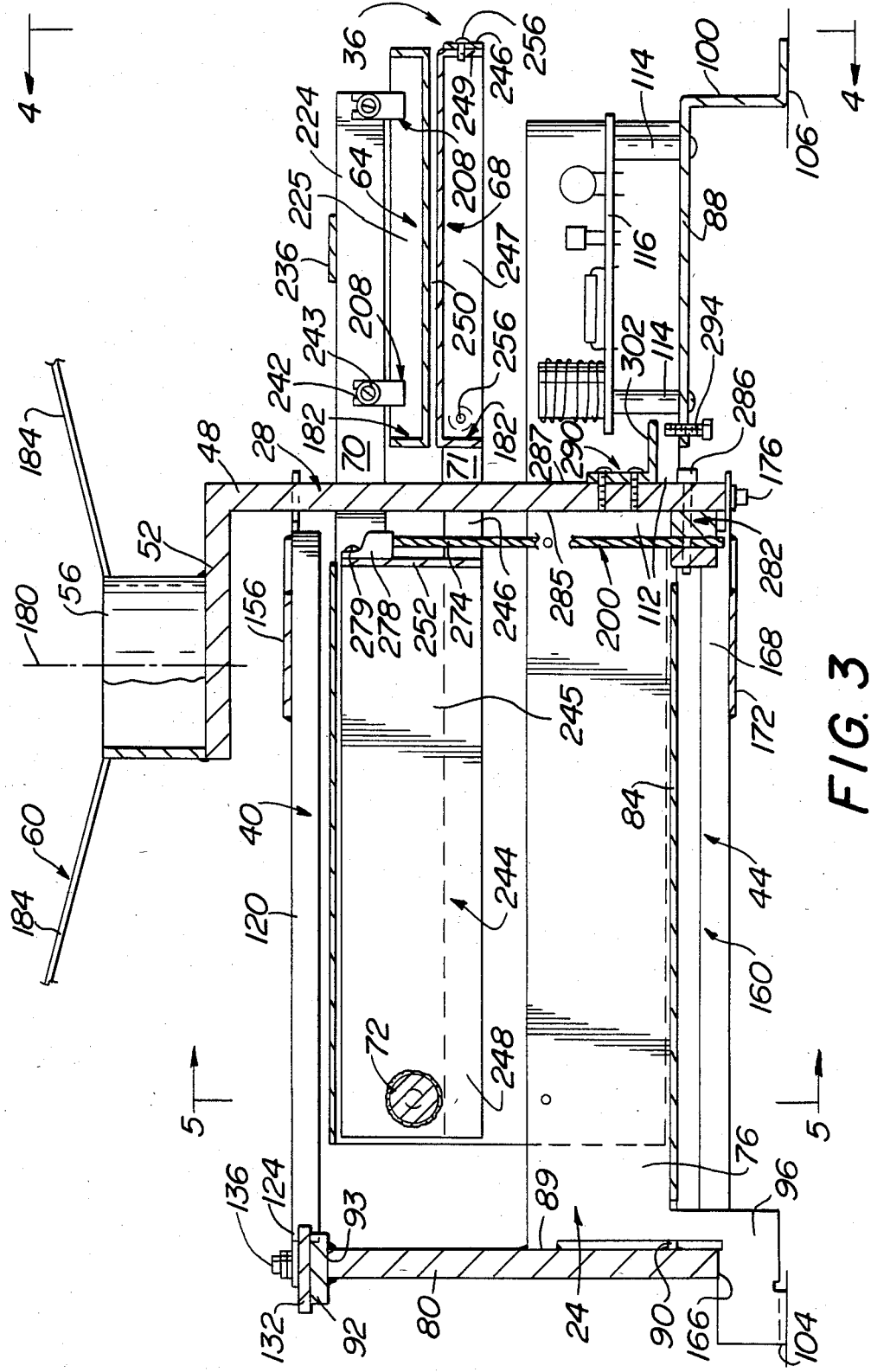

TORSION LOAD CELL

This application is a continuation of application Ser. No. 510,692, filed July 5, 1983, now abandoned.

BACKGROUND OF THE INVENTION

This invention relates generally to measuring apparatus and more particularly to an electronic scale device.

Various electronic scales are commercially available for providing a digital display of the weight of a body placed on a weighing pan. Many of the recently developed scales making use of integrated circuits and microcomputer controls for perfecting various scale operations such as weighing, counting, altering resolution, converting units, etc. In this regard, these devices must not only include electronic circuitry but must also include mechanical interfacing means between the electronic circuitry and the weighing pan.

The mechanical interface generally comprises some form of spring means for biasing the pan in a direction opposite to that of the gravitational force exerted upon the pan by the load being weighed. Thus, prior art devices in general include various types of spring means which generally undergo non-torsional deformation such as stretching or compression and accordingly, generally incur a heat rise in the compressed portions and a temperature drop in other areas. Temperature changes as such are undesirable under such circumstances because they produce corresponding changes in the dynamic properties of the spring, opposing its deflection. Accordingly, the heating and cooling effect introduces error into the measuring process unless compensating means (which are generally complex and expensive) are utilized.

It should be pointed out that with conventional strain gage scales, the above mentioned temperature change effects are not a problem since modern strain gages are constructed having temperature dependent properties which almost exactly offset the temperature dependent properties of the substrate spring material to which they are attached. Thus, the temperature effects are almost entirely cancelled out and accordingly, are generally invisible to the user of the device. However, capacitive or other displacement sensing devices, although otherwise generally superior to conventional strain gage scales, suffer the disadvantage of not having this built-in means for temperature compensation. In this regard, although this effect is generally small (e.g., between 0.01% and 0.3% of total deflection), it nonetheless becomes rather significant when making highly sensitive measurements.

Referring to the prior art, the U.S. Pat. No. 4,273,204 (Gillen), discloses a capacitive weighing scale utilizing a spring for biasing a movable capacitor plate against the force of the load being weighed. Although the Gillen device is generally suitable for its intended purpose, its spring comprises a bendable "C"-shaped steel member which has the tendency to produce the heretofore mentioned heating and cooling effect when it is used.

Other electronic scale devices disclosed in the prior art which also use non-torsional types of spring means are disclosed in U.S. Pat. Nos.: 4,158,395 (Brown); 4,308,929 (Estavoyer) and 4,309,929 (Batson).

OBJECTS OF THE INVENTION

Accordingly, it is a general object of the invention to provide an electronic scale which overcomes the disadvantages of the prior art.

It is another object of the invention to provide an electronic scale which utilizes torsion to effect measurement.

It is a further object of the invention to provide an electronic scale which utilizes torsion spring means to bias the weighing pan against the gravitational force exerted by the material being weighed.

It is still a further object of the instant invention to provide an electronic scale which is durable, relatively simple in construction and may readily be used to accurately and reliably weigh a material or object.

SUMMARY OF INVENTION

These and other objects of the instant invention are readily achieved by providing a scale which can be used to weigh or otherwise measure other parameters of an unknown material or object. The device includes frame means, platform means arranged to move upon receipt of a material thereon and position sensing means coupled to said platform means. The scale further includes torsional means coupled both to the frame means and to the platform means so that movement of the platform means upon receipt of the material thereon causes the torsional means to twist about an axis to product movement detectable by said sensing means, which in turn produces a signal indicative of the weight of the material.

DESCRIPTION OF THE DRAWING

Other objects and many of the attendant advantages of the invention are readily appreciated as the same becomes better understood by reference to the following detailed description when considered in connection with the accompanying drawing wherein:

FIG. 3 is an enlarged sectional view taken along line 3—3 of FIG. 2;

DETAILED DESCRIPTION OF PREFERRED EMBODIMENT

Figure 1:
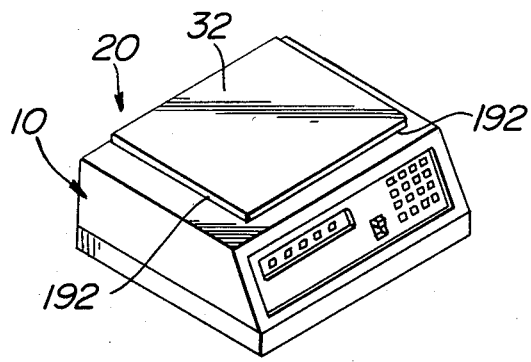
FIG. 1 is a perspective view of an electronic scale constructed in accordance with the instant invention.

Referring now to the various figures of the drawing wherein like reference characters refer to like parts, there is shown at 20 in FIG. 1 an electronic scale constructed in accordance with the instant invention.

Although the device 20 is referred to as a "scale" throughout this patent application, it should be understood that the instant invention is not limited to that of a "weighing" device but can also be used for determining the mass, density, volume and other parameters of a liquid or solid, whenever weight can be used as a factor in making such a determination. In this regard, the utilization of the scale 20 for purposes other than "weighing" is shown and described in my prior U.S. Pat. No. 4,372,405, which issued on Feb. 8, 1983, and whose disclosure is hereby incorporated by reference, herein.

It should also be pointed out at this juncture that the instant invention relates not to the scale's electronic circuitry which is conventional but to an improved mechanical construction, and more particularly to torsional means for achieving greater measuring accuracy and reliability. To that end, the scale 20 is a self-contained, solid state device, which is readily used for measuring the weight or other parameters of an unknown liquid or solid and for providing a digital reading thereof. The device 20 basically comprises a frame assembly 24 (FIG. 3) for supporting various mechanical and electrical components within the scale's casing 10, a suspension system 28 mounted on the frame assembly and supporting the platform or pan 32 (FIG. 1), and displacement responsive transducer means 36 coupled to the suspension system and thus to the pan.

The details of the frame assembly 24 and suspension system 28 will be described later, but suffice for now to state that the suspension system 28 basically comprises upper and lower parallelogram members 40 and 44 respectively, and an interconnecting vertical column 48. An arm 52 extends horizontally from the top of the column 48 just above the upper parallelogram 40. A tubular column 56 is mounted on the arm and terminates at its upper end in a spider 60, upon which the pan 32 is mounted.

The transducer means 36 will be described in detail later, but basically comprises a variable capacitor including an upper plate 64 and a lower plate 68. The lower plate is arranged to be displaced either upward or downward with respect to the upper plate when the pan is loaded or unloaded, as the case may be. The upper plate is fixedly connected to the frame assembly 24, via upper plate support means 70, while the lower plate is mounted on the frame assembly by lower plate support means 71 and spring means 72. The lower plate 68 is also coupled to the pan 32 by the column 56, the arm 52, the column 48 and other elements of the suspension system 28, to be described later.

In accordance with the teachings of this invention the spring means 72 comprises torsion means (e.g., a torsion bar) which is arranged to twist in order to permit displacement of the lower plate 68 relative to the upper plate 64. Moreover, the torsion bar 72 is constructed to twist without undergoing any significant non-torsional (e.g. tensile or compressive) deformation. As shall be described in greater detail later, the torsion means used in the preferred embodiment of this invention provides an advantage over other types of spring systems since it produces a twisting action which can be used to produce deflection in the coupled support members without producing internal heating attributable to extension or compression. As mentioned earlier, the production of heat is undesirable since it causes expansion or compression of the spring means and thus, alters the spring's dynamic properties so as to introduce error into the weighing process. The specific construction of the torsion means 72 of the preferred embodiment shall be described later.

The use of parallelogram members 40 and 44 in a scale suspension system is a conventional technique to insure that only the vertical component of the load is transferred to the pan's displacement detecting means In the case of this invention, the parallelogram members 40 and 44 and associated components of the suspension system performs that same function. Therefore, only the vertical components of the load of the pan is transmitted to the lower capacitor plate 68 by the suspension system. Moreover, the suspension system counteracts all side load and twisting moments (which might be applied to the pan) and rigidly resists all motions except for up/down movement.

The plates 64 and 68 of the capacitor 36 are connected by electrical conductors (not shown) to the input of a variable frequency oscillator. The oscillator produces an electrical signal, whose output frequency is a function of the capacitance of the capacitor 36 and hence, a function of the vertical displacement of the weighing pan 32. The electrical signal from the variable frequency oscillator is acted upon by the electronic circuitry of the device 20 to provide a reading of weight, volume or density of the material placed on the pan. In this regard, the electrical circuitry of the apparatus is not generally shown or described in this application but is set forth in greater detail in my above identified prior patent.

Figure 2:
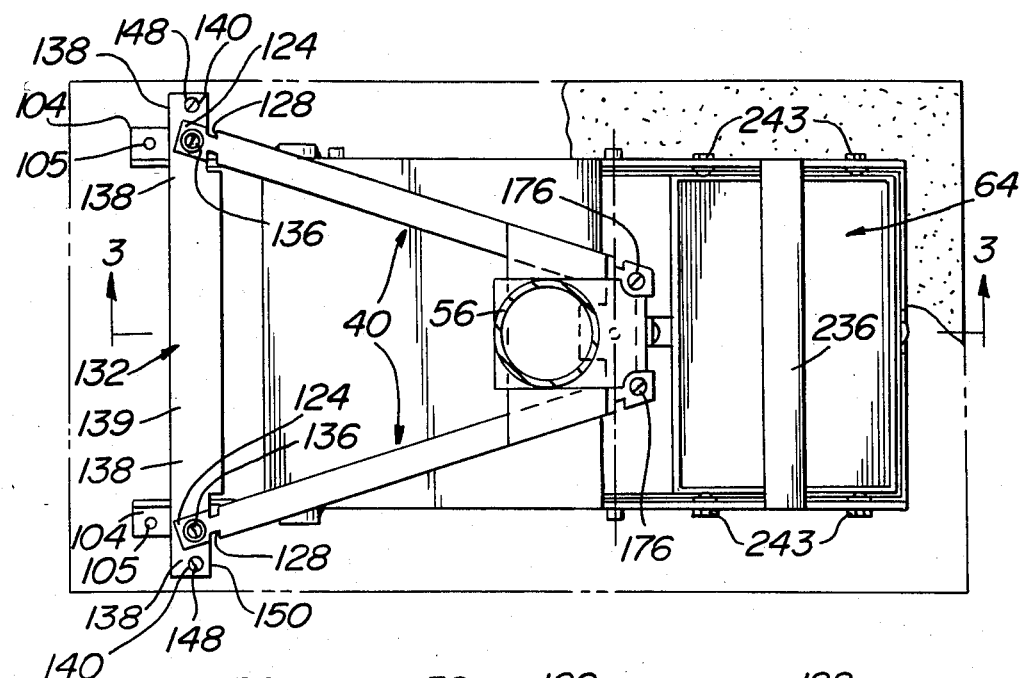
FIG. 2 is a top plan view of the electronic scale shown in FIG. 1 with the casing and platform removed.
Figure 4:
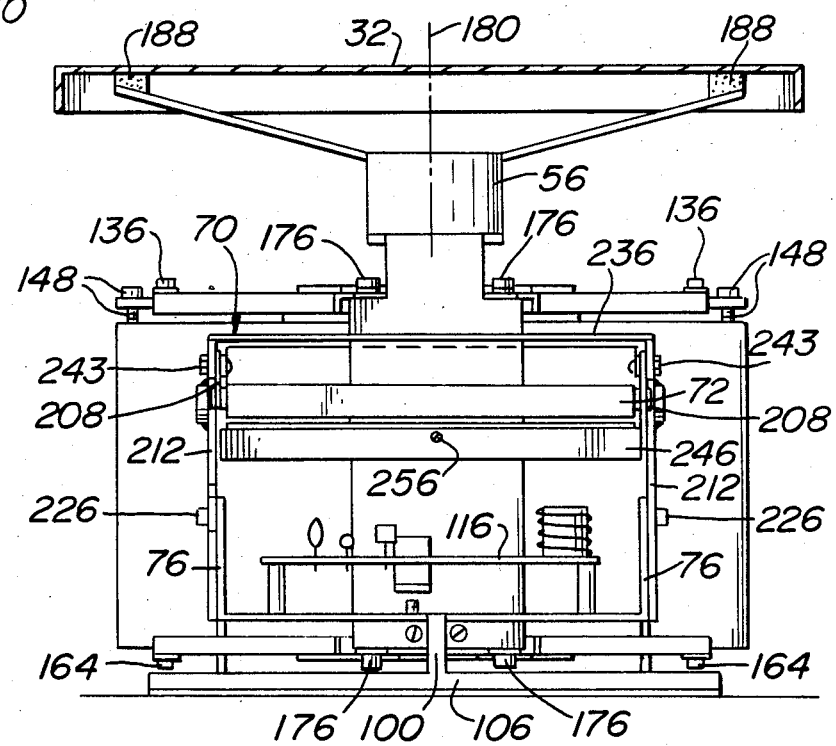
FIG. 4 is a reduced sectional view taken alonng line 4—4 of FIG. 3.

Referring now to the various Figs. of the drawing, the details of the suspension system 28, the frame assembly 24, the capacitor 36, and the mounting means for the capacitor will be described in detail. Thus, as seen in FIGS. 2, 3 and 4 the frame assembly 24 is generally rectangularly shaped and is made up of plural bar-like, frame elements, namely a pair of side frame elements 76 (FIG. 4), an end frame element 80 (FIG. 3), a primary cross-frame element 84 (FIG. 3), a secondary cross-frame element 88 (FIG. 3) and the upper plate support means 70 (FIG. 3), as will be described later.

Referring to FIG. 3, the side frame elements 76 are attached (e.g., welded) at right angles to the end frame element 80. The respective connections are made along vertically disposed joints 89 on the front planar surface of the end frame element. The end frame element 80 is also connected by similar means to the cross-frame element 84 along a joint 90. The connections between the end frame element and the side frame elements and cross-frame element insure that the side frame elements are rigid with respect to the end frame element in the up/down direction.

The end frame element 80 includes a spacer bar 92 fixedly secured at its mid-portion along the top edge 93, of the element 80. The spacer bar 92 operates in combination with a flexible adjustment bar (to be described later) to enable adjustment of the upper paralellogram assembly 40.

The primary cross-frame element 84 and the secondary cross-frame element 88, each comprise a generally rectangular, planar bar, which interconnects the bottom edges of the respective side frame elements 76. The primary cross-frame element 88 is connected to the respective side frame elements adjacent the rear portion of the scale (e.g., beneath the upper parallelogram assembly 40) and the secondary cross-frame element 88 is connected to the side frame elements adjacent the front portion of the scale (e.g., generally beneath the variable capacitor 36). Furthermore, there is a space between the respective cross-frame members, as shall be described later.

The device 20 is supported by a set of legs arranged in a tripod configuration. The set of legs includes a pair of rear legs 96 and a front leg 100. Each rear leg 96 extends and is vertically formed integrally with a respective side frame element 76. Each leg also includes a generally horizontal foot 104, having a mounting hole 105 (FIG. 2), which is used for bolting the scale 20 to a horizontal supporting surface (e.g., a cabinet).

The front leg 100 is formed integrally with the secondary cross-frame element 88 at a position midway between the respective side frame elements 76. The front leg 100 extends vertically downward and includes a generally horizontal foot 106 having a mounting hole (not shown) which is also used for mounting the scale 20 on a horizontal surface.

The suspension components are mounted on the frame assembly 24 located within a space between the end frame element 80 and the capacitor 36, with the upper parallelogram member 40 being located generally above the side frame elements 76, and the lower parallelogram member 44 being located generally below the side frame elements. The area between the primary and secondary cross-frame elements 76 and denoted by the reference numeral 112, defines a space in which the interconnecting vertical column 48 is located.

The electrical components of the oscillator are located on a circuit board 116 which is mounted by standoffs 114 on the secondary cross-frame element 88 and between the respective side frame elements 76. The electrical components shown on the circuit board 116 are merely exemplary of the actual components used.

The upper and lower plates 64 and 68 of the capacitor are supported by the upper plate support means 70 and the lower plate support means 71, respectively so as to locate the capacitor generally above the circuit board 116 and between the side frame elements 76.

The upper parallelogram member 40 comprises a pair of elongated legs 120, each of which is of U-shaped cross-section, except for its opposed end portions 124, (FIG. 2) which are planar. A pair of notches 128 are located in the opposed edges of the planar portions 124 to serve as flex points for the legs of the parallelogram.

In order to permit adjustment of the vertical angle of the legs of the upper parallelogram a flexible adjustment bar 132 is interposed between the planar end portions 124 of the upper parallelogram and the end frame element 80. The adjustment bar mounts the upper parallelogram and is constructed as a generally planar member which is flexible in the up/down direction and rigid in all other directions. Moreover, the adjustment bar 132 is upwardly biased at its respective ends 138. Thus, as can be seen in FIG. 2 the mid-portion 139 of the adjustment bar is attached (e.g., welded) to the top edge of the spacer bar 92 along the entire length of the spacer bar. The adjustment bar also includes a respective mounting hole 140 adjacent each of its ends, while the end frame element 80 includes a correspondingly located pair of internally threaded holes (not shown) along its top horizontal edge so as to permit respective bolts 148 to pass through the mounting holes 140 and engage the internally threaded holes of the end frame element.

Since the intermediate portion 139 of the adjustment bar is welded to the spacer bar and its respective ends are bolted to the end frame element as just described, the height of the respective ends is readily raised or lowered by tightening or loosening the adjustment bolts 148, as desired. As should be appreciated from the foregoing discussion, when the adjustment bolts 148 are loosened, the ends move upwardly under the upward bias force of the adjustment bar. Conversely, when the bolts are tightened, the ends of the bar are pulled downwardly toward the top edge of the end frame element 80 against the bias of the adjustment bar.

Each leg of the upper parallelogram is connected to the top surface of the adjustment bar 132 via respective bolts 136. In addition, the adjustment bar includes a pair of recesses 150 adjacent its respective ends to accommodate the downwardly directed portions of the U-shaped parallelogram legs. Since the legs 40 of the upper parallelogram are attached to the adjustment bar 132 adjacent the respective ends of said bar, the height of the ends and thus the vertical angle of the respective legs are readily adjusted by tightening or loosening the respective adjustment bolts as just described.

As can be seen in FIG. 2, the legs of the parallelogram 40 extend at an acute angle to each other, with the free ends of the legs being located in space 112. The free ends of the parallelogram legs are interconnected by means of a notched plate 156, (FIG. 3) which is attached to the top surface of the respective legs, adjacent the tubular column 56.

The lower parallelogram 44 is constructed in an identical manner to the upper parallelogram and includes a pair of legs 160 which are mounted at one end to the bottom horizontal edge 166 of the end frame element 80, via screws 164 (FIG. 4). The free end portion 168 of the legs of the lower parallelogram also terminate within the space 112 and directly below the free ends of the upper parallelogram legs. The free ends of the lower parallelogram legs include a notched plate 172 which is identically constructed and attached to the lower parallelogram legs as plate 156 is with regard to the upper parallelogram legs.

Figure 5:
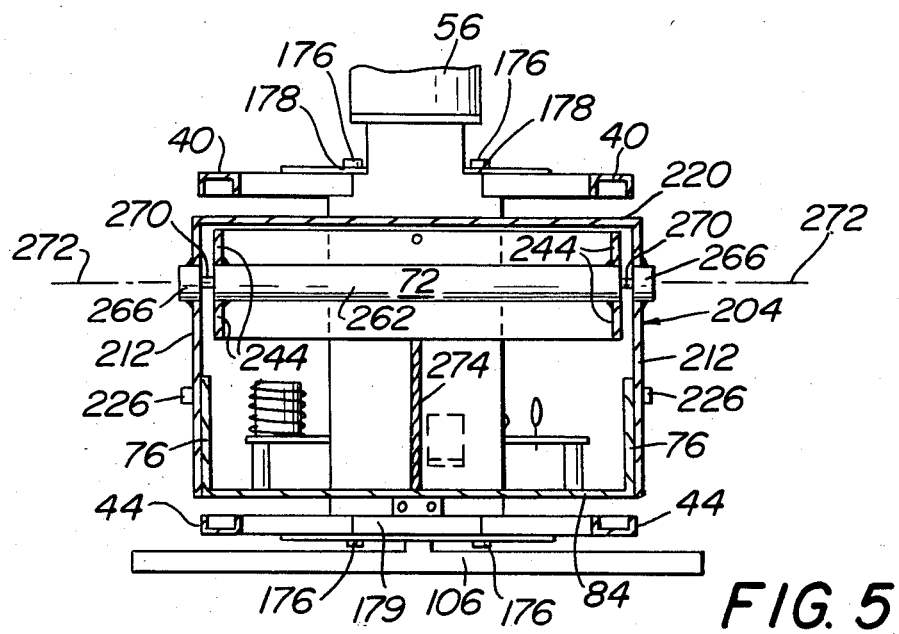
FIG. 5 is a reduced sectional view, partially broken away, taken along line 5—5 of FIG. 3.

The interconnecting column 48 is a rigid, elongated, generally rectangular member which is mounted between the opposed free ends of the two parallelogram members, via respective bolts 176. The upper portion of the column 48 includes a pair of notched shoulders 178 (FIG. 5) to which the free ends of the upper parallelogram legs are bolted and a generally planar bottom edge 179 to which the free ends of the lower parallelogram legs are bolted.

The arm 52 is secured to the top of the interconnecting column 48 (i.e., above the shoulders 178) and as noted heretofore, extends parallel to the parallelogram legs. Moreover, the free end of the arm 52 is located approximately central with respect to the space 112. The tubular column 56 is mounted on the free end of the interconnecting arm 52, with the longitudinal axis of the column, denoted by the broken line 180, defining the center line for the apparatus pan 32.

The spider 60 includes four angularly extending arms 184 (only two of which are shown). Each arm terminates at its free end in a vibration-dampening cushion 188 (FIG. 4). The pan 32 is a generally planar member of rectangular shaped and having a downwardly projecting flanged peripheral edge 192. The pan is arranged to be disposed on the vibration-dampening cushions 188 of the spider for support thereon.

As will be appreciated from the foregoing, when a body or load is placed on the pan, irrespective of its position on the pan, only the vertical component of the load is applied to the free end of the arm 52 along axis 180 (FIG. 4).

The details of the suspension system 28, the capacitor 36, the upper plate support means 70 and the lower plate support means 71 will now be described. The upper plate 64 of the capacitor 36, like the lower plate 68, is a generally planar metallic member, of generally rectangular shape. Each plate includes a flanged portion 182 around its periphery which is connected to the respective plate support means 70 and 71 and to associated electrical conductors (not shown). Thus, the upper plate 64 is fixedly mounted to the frame 24 by the upper plate support means 70, while the lower plate 68 is pivotably connected to the frame assembly 24 by the lower plate support means 71 and the spring means 72. Furthermore, the lower plate is also coupled to the pan 32 via the vertical column 48, the suspension system 28 and a cable assembly 200.

The spring means 72 serves to bias the lower plate 64 upwardly towards the upper plate 64 to a neutral or null position against the downward urging of the suspension system and cable assembly when a load is placed on the pan. As will be described hereinafter, the greater the weight of the load on the pan the further the lower plate is displaced downward relative to the upper plate. This action thus increases the air gap between the capacitor plates thereby decreasing the capacitance of the capacitor 36. The changed capacitance is sensed by the electronic circuitry to provide an indication of the weight on the scale's pan.

The upper plate support means 70 comprises an upper frame assembly 20 (FIG. 5) and a plurality of strap members 208 (FIG. 3). The upper frame assembly 204 is a very rigid one piece unit comprising a pair of vertical side walls 212, a bridging top wall 220 and a pair of arms 224 (FIG. 3) each projecting forward from an associated side wall 212. The side walls 212 are each connected to a respective side frame element 76 by mounting screws 226. The upper frame assembly 204 when mounted as just described is located between the upper and lower parallelogram assemblies, with each arm 224 extending from its respective side wall 212 in a generally co-planar, horizontal direction and disposed generally above the side edges of the secondary cross-frame element 88. A cross-bar 236 interconnects the respective arms 224 at an intermediate location to insure that the arms remain parallel and rigid with respect to each other.

The strap members 208 are thin strips which serve to suspend the upper capacitor plate from the arms 224. In this regard, each strap is bolted at one end to a respective arm 224 and is adhesively secured at its opposite end to an insulator (not shown) which is adhesively secured to a lateral side portion 225 of the flange of the upper capacitor plate. In the preferred embodiment of the invention, four such straps are used, with two straps being attached to each side portion 225 and arranged so that there is a strap situated adjacent each of the four respective corners of the upper plate.

Referring to FIG. 3, each strap is a very thin, planar and generally rectangular member having a U-shaped slot 242 adjacent its upper end. Each slot serves as a mounting opening for securing the strap onto the end being connected to the upper frame assembly arm 224 via an associated bolt 243. The U-shaped slot permits adjustment of the position or angle of the upper plate by varying the position of the straps relative to the arm 224. Thus, the gap 250 between the upper and lower plates can be adjusted or calibrated readily by loosening the mounting bolts, accurately positioning the capacitor plate and then tightening the bolts.

Referring to FIG. 3, the lower plate support means 71 is mounted on the frame by the torsion spring (as will be described later) and basically comprises a generally rectangular support bracket 244. The support bracket 224 is constructed of a relatively thick walled base portion 245 and a pair of projecting arms 246. The thick base portion 245 is very rigid, particularly in the up-/down direction so as to minimize the effects of non-torsional stresses and strains which may be encountered.

The base portion comprises a pair of parallel side walls 248 which are disposed generally parallel to and adjacent (but free of contact with) the side walls of the upper plate supporting bracket 70. The side walls are interconnected by means of a thick vertical front wall 252 which is disposed generally parallel and adjacent the vertical column 48.

The arms are each thin elongated planar strips of extending horizontally in a vertical plane from the sidewalls of the base 244. Thus each arm is rigid in an up-/down direction, but flexible in all other directions. Each arm is attached (e.g., welded) to the outer surfaces of the respective side walls 245 of the base portion 248. The outermost end of the arms are joined by a bridging stip integrally formed with the arm to form a generally "U"-shaped configuration. This U-shaped projection is configured to encircle the periphery of the lower capacitor plate 68 to serve as the mounting means therefore. Thus, respective portions of the strap are parallel to the respective side flange portions 247 and front flange portion 249 of the lower plate and are attached thereto by a set of three mounting screws 256. Each of the three mounting screws connects a portion of the strap to the left side, right side, and front flange, respectively, of the lower capacitor plate.

As mentioned earlier the support bracket 244 (FIG. 5) is mounted on the upper frame assembly 204 by the torsion spring means 72. The spring means 72 basically comprises an elongated cylindrical member or bar formed of a strong, yet resilient metal, (e.g., stainless steel), and having a pair of reduced diameter neck sections 270, each adjacent a respective end 266 of the bar. Each end 266 of the bar is fixedly secured to a respective sidewall 212 of the upper frame assembly. The reduced diameter neck portions 270 are of substantially smaller cross-section than the remainder of the torsion bar and thus serve as the actual spring or torsion means of the device since they serve as the twist situs when a torque is applied to the intermediate portion 262 of the bar relative to the end portions thereof. In this regard, each neck portion is of relatively short length (e.g., approximately 2½ times its diameter) to minimize any bending which might occur along these portions. However, as a practical consideration the shortness of these portions is limited by the fact that the shorter the length, the greater is the twist per unit of length and stress.

The securement of each end of the torsion bar is as follows: the outer portions 266 of the torsion bar extend through respective holes in the side wall 212 of the upper frame assembly and are welded in place. The sidewalls 244 of the lower capacitor support bracket are also fixedly secured to the torsion bar. To that end, portions of the the intermediate portion 262 of the torsion bar contiguous with each neck portion extend through an associated bore in an associated side walls 244 of the lower capacitor support bracket and are fixedly attached, (e.g., welded) thereto.

As a result of the foregoing arrangement, it should be appreciated that inasmuch as the reduced thickness (cross section) portions 270 are of lesser cross-section than the other portions of the torsion bar, when a force is applied to the lower capacitor plate mounting bracket 244 as a result of weight being added to the pan 32, the reduced thickness portion 270 of the torsion bar 72 rotates or twists evenly about the longitudinal central axis 272 of the bar. Thus, the intermediate portion 262 of the torsion bar rotates along with the lower capacitor plate mounting bracket 244, relative to the end portions 266 of the bar and the upper frame assembly 204.

As should be appreciated by those skilled in the art, the twisting or torsional movement of the cylindrical bar is not accompanied by non-torsional deformation and therefor, does not produce heating and cooling as would occur using spring members (e.g., compression springs) which undergo non-torsional deformation. As a result of the general absence of heating and cooling of the torsion bar 72, the amount of error introduced into the weighing process, attributable to the heating and cooling effect of the spring means is substantially if not entirely eliminated.

In accordance with a preferred embodiment of this invention the torsion bar is of circular cross section area since that shape produces a generally pure twist action without any accompanying non-torsional deformation or stresses, as would occur using a bar of some other cross-sectional shape (e.g., an oval bar). Furthermore, by using a heavy section 262 between the two reduced diameter sections, the mounting bracket 71 which is attached to the bar pivots in a generally uniform fashion (e.g., both sides rotate equally) as the reduced diameter sections twist.

It should further be appreciated that when weight is removed from the pan, the biasing tension of the torsion bar causes the bar to twist in the opposite direction (e.g., toward an untwisted position or state), resulting in the lower plate support means 71 and lower capacitor plate 68 pivoting in a generally upward direction. Thus the lower plate pivots towards the upper plate to produce a corresponding change in capancitance to indicate a reduced amount of weight on the pan 32.

It should still further be appreciated that in a commercial embodiment of the device 20, its electronic circuitry is calibrated so that when the torsion bar 72 is at equilibrium under the weight of an empty weighing pan 32, the display means indicates a weight of zero. Furthermore, in its preferred embodiment, the scale is constructed so that even when there is no load on the pan 32, there will still remain a gap 250 between the respective capacitor plates 64 and 68.

The cable assembly 200 serves as means for coupling the lower plate support means 71 to the vertical column 48 and hence to the pan 32. As best shown in FIG. 3, the cable assembly 200 basically comprises a metal, non-stretchable cable 274, an upper clamp assembly 278 and a lower clamp assembly 282. The upper clamp assembly 278 is threadedly attached by a screw 279 to the front surface of the front wall 252 of the lower plate support means 71 at a central position with respect thereto. The cable 274 is fixedly secured to the upper clamp assembly 278 in a conventional fashion. The lower end of the cable is secured by the lower clamp assembly 282 to the lower portion of the vertical column 48. In this regard, the lower clamp assembly 282 is attached to the vertical column 48 at a central position with respect to the column 48. The lower clamp assembly 282 includes a central opening through which the lower end of the cable passes and is secured by two perpendicularly disposed screws 286. The screws engage the clamp assembly 282 to hold the cable in place and when the screws are loosened, one can vary the effective length of the cable to approximately set the gap between the two capacitor plates. However, the precise gap 250 between the plates, is adjusted as mentioned before, by loosening the bolts 243 and moving the straps 208.

As can be seen in FIG. 3 the lower clamp assembly 282 is constructed to situate the end of the cable to which it is connected, a predetermined horizontal distance from the rear planar surface 285 of the vertical column, to dispose the cable vertically within the space 112, between the front wall 252 and the vertical column 48.

In view of the foregoing discussion and description, it should readily be appreciated that movement of the vertical column 48 in a downward direction pulls the cable 274 in a downward direction. Since the cable 274 is connected to the front plate 252 of the lower capacitor mounting bracket 244, downward movement of the cable pulls downwardly on the front plate 252 of the lower capacitor mounting bracket, causing the reduced thickness portions 270 of the torsion bar to twist and the mounting bracket to pivot downwardly about the central axis 272 of the torsion bar. The downward rotation of the mounting bracket causes the planar surface of the lower capacitor plate to move in a generally downward direction, thus increasing the gap 244 between the upper and lower plates.

Conversely, movement of the vertical column 48 in an upward direction reduces the tension in the cable 274 enabling the torsion bar 72 to untwist (e.g., move towards an untwisted equilibrium state), resulting in the lower capacitor mounting bracket 244 pivoting upwardly. Upward pivoting of the bracket 244 causes the lower plate 68 to move upwardly so as to reduce the size of the gap 244 between the respective plates 64 and 68.

In order to prevent overtravel of the lower capacitor plate downward, the vertical column 48 further includes a stop member 290 (FIG. 3) which coacts with a set screw 294 to limit the downward vertical movement of the column. The stop member 290 comprises an "L"-shaped bracket which is bolted to the front surface 287 of the vertical column at a slightly off center position. The free end of the set screw 294 is threaded through the secondary cross-plate 88 and extends a predetermined distance upwardly therefrom, to engage a horizontal leg 302 of the bracket 290 at the downward most position of the front plate.

As should be appreciated by those skilled in the art the maximum amount of weight which can be placed on the pan can be readily adjusted within predetermined limits by rotating the set screw 294 to either increase or decrease how far its free end extends above the secondary cross bar 88.

The electrical components as shown in in various figures of the drawing, are merely exemplary of components used in an actual embodiment of the device, are of conventional construction and arrangement and are more fully described in the disclosure of my above mentioned patent. Thus, the actual electronic components and circuitry need not be described in detail herein. Suffice it to state for now that the electrical components include variable frequency oscillator means which produces an electrical signal whose frequency corresponds to the electrical capacitance of the capacitor 36. This electrical signal is readily used for producing another signal indicative of the weight or other meansurements relating to the object on the weighing pan 32. Additionally, the electrical components of the scale 20 include solid state memory or storage means and microprocessor means, including an algorithm compliment for effecting the various calculations and routines required. Thus, such storage means includes an algorithm which compensates for capacitance variations resulting from various changes other than those which the torsional means serve to preclude from occurring.

As will be appreciated from the foregoing, the instant invention provides means for measuring the weight of an unknown object with great accuracy and precision. The torsional means used in the device further prevents the introduction of error or inaccuracy as a result of thermal changes caused by the non-torsional deformation of spring means.

Without further elaboration, the foregoing will so fully illustrate my invention that others may, by applying current or future knowledge readily adapt the same for use under various conditions of service.

I claim:

1. An electronic scale comprising a pair of beam assemblies interconnected by torsion means, platform means attached to one of said beam assemblies and arranged to move upon receipt of some material thereon, said beam assemblies being very rigid in the direction of applied force when a material is placed on said platform means for minimizing non-torsional deflections of said assemblies, one of said beam assemblies being a stationary unit and the other of said beam assemblies being mounted for movement through flexure members that are free of relatively movable bearing surfaces, said others of said beam assemblies including a support bracket having a section closely adjacent said stationary unit, said support bracket being attached to and movable with said platform means and being movable relative to said stationary unit, electronic position sensing means including a member coupled to move with the platform means and said support bracket for producing an electrical signal indicative of the weight of said material, said torsion means comprising a torsion means comprising a torsion bar coupled both to said stationary unit and to said closely adjacent section of the support bracket through torsional force-transmitting, non-slip coupling means including welds, said torsion bar having a portion located in the region between the stationary unit and said adjacent section of the support bracket and constituting the twist situs of said bar, said portion of said bar extending for a sufficiently short distance to substantially eliminate non-torsional deflections in said bar, and thereby substantially eliminate the heating and cooling effects associated with such non-torsional deflections in said bar, whereupon movement of said platform means upon receipt of said material thereon causes said portion of the bar, through the coupling of the bar to the stationary unit and the closely adjacent section of the support barcket, to twist about an axis of said bar to produce torsional movement detectable by said sensing means, with said sensing means producing an electrical signal indicative of the weight of said material.

2. The scale of claim 1 characterized in that the support bracket includes spaced-apart sections, each of said sections being closely adjacent a corresponding section of the stationary unit, said bar including a cylindrical portion located in the region between each section of the support bracket and the closely adjacent corresponding section of the stationary unit, each of said cylindrical portions constituting a twist situs of the bar and extending for a sufficiently short distance to substantially eliminate non-torsional deflections in said bar, and thereby substantially eliminate the heating and cooling effects associated with such non-torsional deflections.

3. The scale of claim 2 characterized in that said bar is a substantially linear member extending through linearly aligned openings in the spaced-apart sections of the support bracket and the closely adjacent corresponding sections of the stationary unit, said openings being of a circular cross-section, sections of said bar having a circular cross-section extending into the linearly aligned openings and being coupled to the spaced-apart sections of the support bracket and the closely adjacent corresponding sections of the stationary unit by welds.

4. The scale of claim 3 characterized in that the linear section of the bar located between the spaced-apart sections of the support bracket is thicker than the portions of the bar located between each of the spaced-apart sections of the support bracket and the closely adjacent corresponding section of the stationary unit.

5. The scale of claim 3 characterized in that the bar is of a circular cross-section throughout its linear extent.

* * * * *